United States Patent [19]

Kane

[11] Patent Number: 4,735,250
[45] Date of Patent: Apr. 5, 1988

[54] DUAL TIRE SEAL INFLATOR

[75] Inventor: John P. Kane, Sterling Heights, Mich.

[73] Assignee: Allied Automation Systems, Inc., Detroit, Mich.

[21] Appl. No.: 65,676

[22] Filed: Jun. 18, 1987

Related U.S. Application Data

[63] Continuation of Ser. No. 383,026, May 28, 1982, abandoned.

[51] Int. Cl.$^4$ .............................................. B60G 25/06
[52] U.S. Cl. ....................................... 157/1.1; 157/1.2
[58] Field of Search ......................... 157/1.1, 1.2, 1.17, 157/1

[56] References Cited

U.S. PATENT DOCUMENTS 3,700,021 10/1972 Motis ..................................... 157/1.1
3,774,664 11/1973 Matysak ............................... 157/1.1

Primary Examiner—Debra Meislin
Attorney, Agent, or Firm—Basile and Hanlon

[57] ABSTRACT

The invention pertains to a high production tire inflator apparatus for rapidly inflating tubeless tires wherein sealing between the tires and the wheels occurs at the tire beads. A tandem expansible chamber motor unit utilizing compressed air and hydraulic pressurized fluid vertically translates a carriage upon which an annular tire seal is mounted for displacement between tire indexing, sidewall displacement and bead seating positions, compressed air being used to displace the tire seal during rapid transverse movement, and the hydraulic fluid motor being employed to lock the tire seal to resist inflation pressures during pressurization of the apparatus. The wheel and tire are mounted upon a conveyor pallet which is of such configuration to directly sealingly engage the lower tire sidewall, and during inflation all sealing occurs between the tire sidewalls and the inflation apparatus, and no sealing of the wheel rim is required.

12 Claims, 2 Drawing Sheets

Fig_1.

DUAL TIRE SEAL INFLATOR

This application is a continuation of application Ser. No. 383,026, filed May 28, 1982, now abandoned.

BACKGROUND OF THE INVENTION

The mounting of tubeless tires upon wheels by automobile manufacturers is normally accomplished by high production apparatus wherein a wheel is placed upon a conveyor, the tire is preliminarily positioned relative to the wheel, and as the wheel and tire are conveyed from station to station, the tire may be soaped, the tire forced over the wheel rim and mounted intermediate the wheel rims, the wheel and tire may be rotated relative to each other in accordance with previously applied reference points, and the tire is inflated to a predetermined pressure.

To reduce the duration required for inflation it is common practice to impose an annular axial force upon one of the tire sidewalls which causes the other tire sidewall bead to seat against the associated wheel rim while the deflected sidewall bead is displaced from its wheel rim. Thereupon, an inflation chamber is defined by wheel rim engaging apparatus and compressed air is forced into the tire around the displaced sidewall bead, and upon the desired pressurizing being accomplished the deflected tire sidewall is permitted to expand to seat its bead against the wheel rim to maintain the inflation pressure, and such inflation can be readily accomplished in a very short time.

With high production tire inflation apparatus of the aforementioned type an annular inflation chamber is defined which includes the interior of the tire wherein pressurization of the chamber produces the desired pressure within the tire. To define the inflation chamber an annular wheel seal is usually employed which engages the wheel rim. Further, an annular tire sidewall seal is normally employed which engages the tire sidewall for displacing the sidewall, and also defining the pressurized chamber. The sidewall engaging seal and the wheel rim engaging apparatus are displaceable with respect to each other to produce the desired sequence of operation, but no sealing apparatus is associated with the opposite side of the tire as the seal, which is usually a "lower" seal, is achieved by the engagement of the tire bead with the wheel rim. An example of the aforedescribed tire inflation apparatus is illustrated in assignee's U.S. Pat. No. 4,183,392.

There are several disadvantages inherent in high production tire inflation apparatus as described above. One serious problem occurs at the lower tire bead and wheel rim which are to form a seal during inflation. In order for an effective seal to occur between the nondisplaced tire sidewall bead and the associated wheel rim the bead must fully seat upon the rim. However, due to tire deformation arising from tire banding, temperature, design, or other reasons, an excessive gap or clearance may exist between the uninflated lower tire sidewall bead and rim. Thus, when the apparatus is pressurized considerable air may be lost because of the misfit between tire bead and rim, high noise levels are created due to the escape of large quantities of high pressure air, and if a seal cannot be established the tire will not inflate and must be recycled, and perhaps remounted to produce the required seal necessary for inflation.

Another disadvantage of known tire inflation apparatus results from variations in tire sizes. Most tire inflation apparatus requires that the sizes of the sealing structure for the wheel rim and tire sidewall be changed when different sizes of wheels and tires are inflated, and to change over an inflation line from one tire size to another is time consuming and expensive. Also, there is often a need to "mix" tire sizes on an inflation line, but unless there are only small differences between the sizes the accommodation of different wheel and tire sizes is not readily achieved with conventional apparatus.

Also, in tire inflation apparatus which engage the wheel rim to seal there is the possibility of damaging the rim, particularly in view of the fact that wheels are often formed of aluminum or relatively light gauge steel, and decorative rims are common.

As described above, the majority of tire inflation apparatus wherein the air is introduced into the tire about a displaced sidewall seals the nondisplaced sidewall bead to the tire rim, however, it is known to engage the nondisplaced tire sidewall with a sealing edge or a supporting surface, and such apparatus is shown in U.S. Pat. Nos. 2,595,258; 3,366,153 and in the assignee's U.S. Pat. No. 2,190,117. However, the apparatus shown in these patents is not readily usable with a variety of tire sizes as desired and the inflation apparatus shown in these patents does not overcome many of the problems of the known prior art inflators.

It is an object of the invention to provide high production tire inflation apparatus which is capable of accommodating a wide variety of wheel and tire sizes without modifying the inflation apparatus.

Another object of the invention is to provide tire inflation apparatus of the high production type wherein the wheel is not sealingly engaged during inflation, and both sidewalls of the tire are utilized in the sealing phase during inflation.

Another object of the invention is to provide high production tire inflation apparatus capable of rapidly inflating a tubeless tire wherein both compressed air and pressurized fluid motors are employed in the operation of the apparatus to most effectively translate the inflation components, and resist the pressures imposed upon the apparatus during inflation.

Yet another object of the invention is to provide high production tire inflation apparatus which utilizes an optical sensor to determine the location of a tire sidewall.

An additional object of the invention is to provide a high production tire inflator apparatus wherein the wheel and tire to be inflated are mounted upon a conveyor pallet and the pallet forms a portion of the sealing structure.

In the practice of the invention the tires to be inflated are mounted upon conveyor pallets wherein the tires are indexed between various stations at which the mounting and inflation sequences occur. When the tire and wheel arrive in the inflation apparatus of the invention the tire is located between the wheel rims, and the tire is being supported upon a pallet having a vertical axis. The pallet preferably includes a circular peripheral edge which engages the lower tire sidewall, and this engagement of the pallet and tire sidewall forms a seal during inflation.

The inflation apparatus includes a frame upon which a carriage is vertically positionable by means of a tandem expansible chamber motor system. The motor system includes two coaxial cylinder and piston motors, one motor being operated by compressed air, while the other is operated by pressurized hydraulic fluid, and appropriate controls and valves are utilized with the motors to permit sequential operation thereof. Basically, the air motor is utilized to rapidly lower or raise the carriage and inflation apparatus, while the hydraulic motor is employed to lock the carriage to resist forces imposed upon the carriage by the compressed air during inflation.

The carriage includes an annular tire seal inflation ring head which is lowered into engagement with the upper tire sidewall by the air motor. Upon engagement with the tire sidewall the tire seal will deflect the upper tire sidewall downwardly to produce a clearance between the upper sidewall bead and the upper wheel rim. Such downward pressure imposed upon the tire firmly forces the lower tire sidewall into engagement with the sealing edge defined upon the conveyor pallet, and an inflation chamber is formed by the pallet, tire and seal ring.

The lowering of the seal ring into engagement with the tire occurs under the rapid traverse movement of the compressed air operated motor and a sensing switch engages the wheel rim as the seal ring lowers to sense the size of the wheel and this switch operates the motor controls when sufficient engagement with the tire has occurred to stop the seal ring movement and operate the hydraulic motor which now becomes effective. A compressed air inlet located in the seal ring now permits compressed air to be rapidly introduced into the inflation chamber which quickly produces the desired inflation pressure therein. The upward force imposed upon the seal ring and carriage by the air pressure within the inflated chamber is resisted by the locked hydraulic motor.

After the inflation pressure has been reached the introduction of compressed air into the inflation chamber terminates, and under the control of the hydraulic motor the carriage and seal ring is raised sufficiently to permit the upper tire sidewall bead to seat against the upper wheel rim trapping air within the tire at the desired inflation pressure. Thereupon, air is bled from the seal ring under controlled noise abatement conditions, and upon the seal ring reaching atmospheric pressure the air motor quickly raises the carriage and seal ring from the tire readying the apparatus for the next inflation cycle. The conveyor is indexed and the cycle may then be repeated.

The use of the compressed air motor permits the rapid traverse carriage movement necessary to attain the desired production rate and to achieve such rapid movement with a hydraulic motor system requires high horsepower. The use of the locking hydraulic motor during the inflation cycle permits the high forces imposed upon the seal ring and carriage during inflation to be effectively resisted and very accurate positioning of the seal ring is possible as is necessary when accommodating tires of various sizes.

No contact with the wheel rim exists during the inflation process except for the purpose of sensing the location of the wheel rim. Thus, there is no likelihood of damage to the wheel even though the wheel may be formed of aluminum or relatively light gauge steel, or the rim may be of a decorative type.

The utilization of the pallet as a seal due to the engagement of the pallet edge with the lower tire sidewall simplifies the pallet construction, produces superior sealing with respect to bead and wheel rim sealing, and inflation problems due to deformations existing in the uninflated tire bead due to tire banding, temperatures or other factors are minimized as sealing occurs at both tire sidewalls during inflation. Further, as the apparatus of the invention only requires the positioning of the seal ring on the tire sidewall, and does not require positioning of seal ring structure against the wheel rim, the controls and structure necessary in the practice of the invention are simplified with respect to high production tire inflation apparatus presently being utilized.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
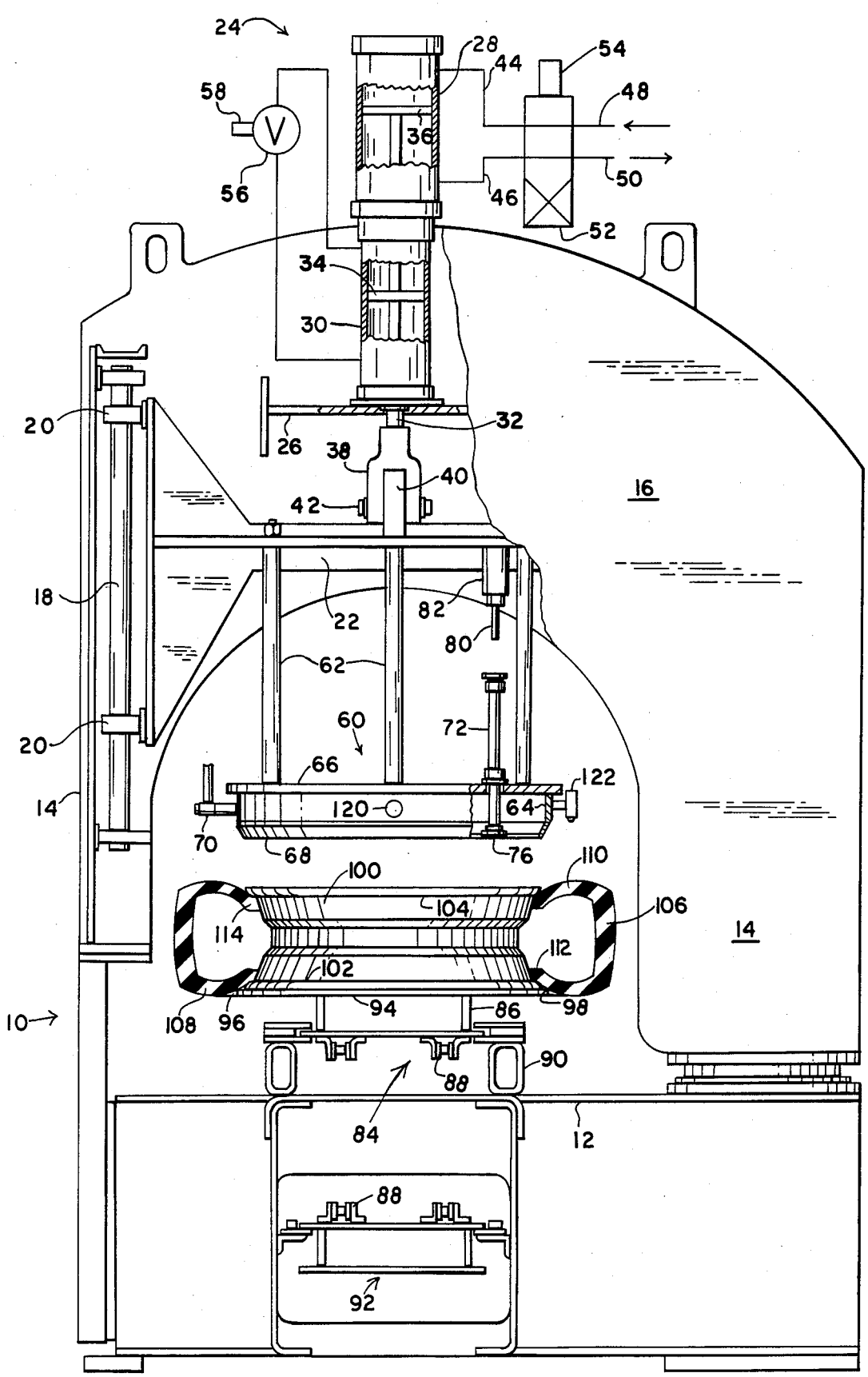
FIG. 1 is an elevational view, partially sectioned, of tire inflation apparatus in accord with the invention, the inflation head being shown in the raised position.

With reference to FIG. 1, the tire inflation apparatus of the invention includes a frame generally indicated at 10. The frame includes a base 12 into which conveyor structure is incorporated, and frame columns 14 vertically extend from the base interconnected by bridge portion 16.

Within each of the columns 14 vertical ways 18 are supported upon which the carriage guides 20 slide. The guides 20 support the carriage 22 for vertical movement, and the carriage is vertically displaced between its several positions by a tandem expansible motor unit assembly generally indicated at 24. The motor assembly 24 is mounted upon the bridge 16 by bracket 26 and the motor assembly includes an expansible chamber air motor 28 operated by compressed air, and an expansible chamber hydraulic fluid motor 30 filled with hydraulic oil which functions as a lock. A piston rod 32 extends through each of the motors 28 and 30, and a piston 34 is mounted upon the piston rod within motor 30 while the piston 36 is located within motor 28. The piston rod extends from the lower region of the assembly 24, and a clevis 38 is mounted thereon for attachment to the hanger 40 affixed to the carriage 22 by pin 42.

The controls for the motors 28 and 30 are schematically illustrated in FIG. 1 wherein conduits communicate with the opposite sides of both pistons 34 and 36. Conduit 44 communicates with the upper side of piston 36 while conduit 46 communicates with the lower side thereof. Compressed air is supplied at pipe 48 and exhausted at 50. The sliding block valve 52 controls the flow of air through operation of solenoid 54. The opposite sides of piston 34 are connected by valve 56 operated by solenoid 58.

The inflation head generally indicated at 60 depends from the carriage 22 upon a plurality of rods 62, and the inflation head includes an annular tire seal ring 64 affixed to the lower ends of the rods. The seal ring 64 includes an upper plate 66, and the downwardly extending ring terminates in an obliquely disposed lip having a lower edge 68. The diameter of the lip edge 68 is greater than the diameter of the rim of a wheel to be accommodated by the apparatus, and a compressed air supply fitting 70 communicates with the ring 64 for injecting air within the ring below the plate 66.

A switch actuator 72 is mounted within the plate 66 and consists of a double rod cylinder which includes a vertically displaceable rod 74 having a lower pad 76 mounted thereon for selective engagement with the wheel rim, and the upper end of the rod 78 engages the actuator 80 of electric switch 82 mounted on carriage 22. As later described, the operation of the switch 82 controls the operation of the motor assembly 24.

A conveyor generally indicated at 84 passes through the base 12, and the conveyor is of any conventional construction, usually of the chain type. The conveyor includes a plurality of pallets 86 mounted upon the chain 88 at spaced locations, and the pallets ride upon support rails 90 mounted upon the base. The return portion of the conveyor is indicated at 92.

The wheel supporting pallets 86 include a circular support plate 94 having a periphery 96 and the periphery includes an upper edge 98 of a circular configuration, and a diameter greater than the diameter of the wheel 100 mounted upon the pallet.

The pallet 86 may include a centering post, not shown, or other apparatus for generally locating the wheel 100 upon the pallet, and the wheel includes the lower rim 102 resting upon the pallet plate 94, and an upper rim 104. The configuration of the wheel 100 is of the conventional forms used with tubeless tires.

In the drawing figures a typical tubeless tire is illustrated at 106, the tire including a lower sidewall 108 and an upper sidewall 110. The lower sidewall 108 includes a bead 112, while the upper sidewall 110 terminates in bead 114. Upon the tire 106 being initially mounted upon the wheel 100, and before inflation, the lower sidewall 108 will normally engage the pallet edge 98 due to the weight of the tire, and the upper bead 114 may engage the wheel rim 104, as shown in FIG. 1, due to the resiliency of the tire, or the bead 114 may be located below the upper wheel rim.

In operation, the carriage 22 will be raised to its uppermost "normal" position as represented in FIG. 1. The carriage will be in this position as raised by the air motor 28 at the termination of the previous inflation cycle.

Figure 2:
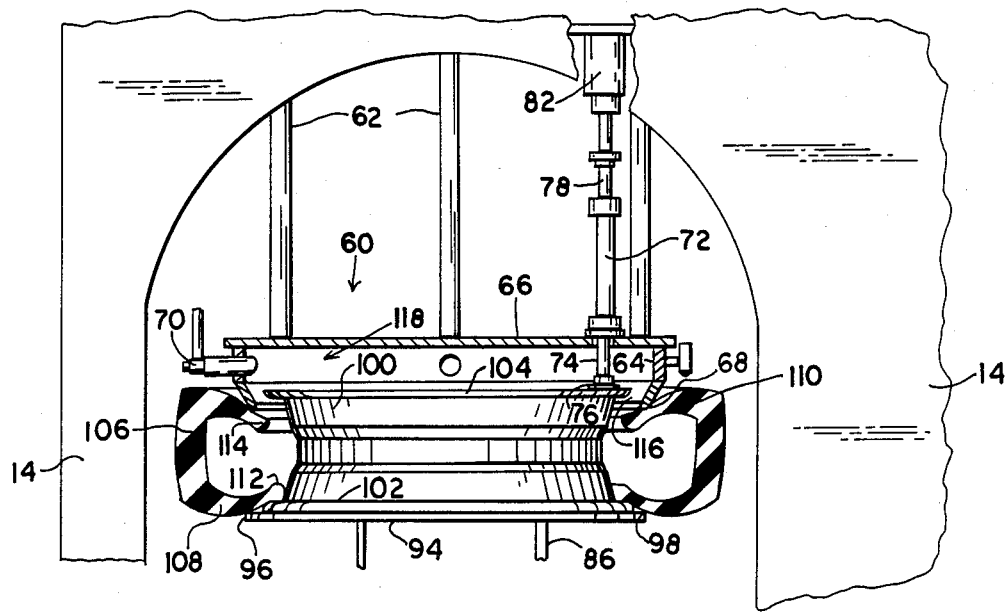
FIG. 2 is a detail, enlarged, elevational view, partially sectioned, illustrating the relationship of the tire and inflation head upon displacement of the upper tire sidewall during inflation.

The conveyor 84 is operated to position a pallet 86 coaxial with the inflation seal ring 64, and conventional conveyor positioning controls, not shown, will stop the conveyor when a pallet is aligned with the seal head. With the pallet so positioned, the wheel 100 and the mounted tire 106 will also be substantially coaxial with the seal ring, and at this time the valve 52 for the air motor 28 is automatically actuated by conventional interconnecting electrical conveyor operated controls to pressurize the air motor through conduit 44 and lower the carriage 22 upon its ways 18. The lowering of the carriage and inflation head 60 under the air motor movement quickly lowers the seal ring 64 over the upper wheel rim 104 and the lip edge 68 will engage the tire upper sidewall 110 as shown in FIG. 2. Lowering of the seal ring 64 continues until the predetermined position of the seal ring is attained as sensed by the switch 82. As the inflation head 60 is lowering the switch actuator rod pad 76 will engage the upper wheel rim 104 and terminate the downward movement of the rod 74. Thus, as the seal ring lowers the rod 78 will engage switch actuator 80 and closing of the switch 82 by the rod 78 indicates to the apparatus the width of the wheel 100, and the seal ring 64 will be lowered sufficiently to displace the tire upper sidewall 110 to form a clearance 116 between the bead 114 and wheel rim 104.

Under the control of the switch 82 the valve 56 of the hydraulic motor 30, which has previously been open, closes and operates to "lock" the hydraulic motor, and thereby lock the carriage and inflation head against vertical displacement. The compressed air is now introduced into the seal ring 64 through fitting 70, wherein a closed chamber 118 has been defined by the tire 106, seal ring 64 and plate 96. Sufficient compressed air is introduced into the chamber 118 to produce the desired inflation pressure within the tire when the inflation head is raised.

It is to be appreciated that as the seal ring 64 forces the tire sidewall 110 downwardly to define clearance 116, this force on the tire will firmly engage the lower sidewall 108 with the pallet edge 98 sealing the sidewall 108 with respect to the pallet. Thus, with the single operation of lowering the inflation head 60 the inflation chamber is defined.

Figure 3:
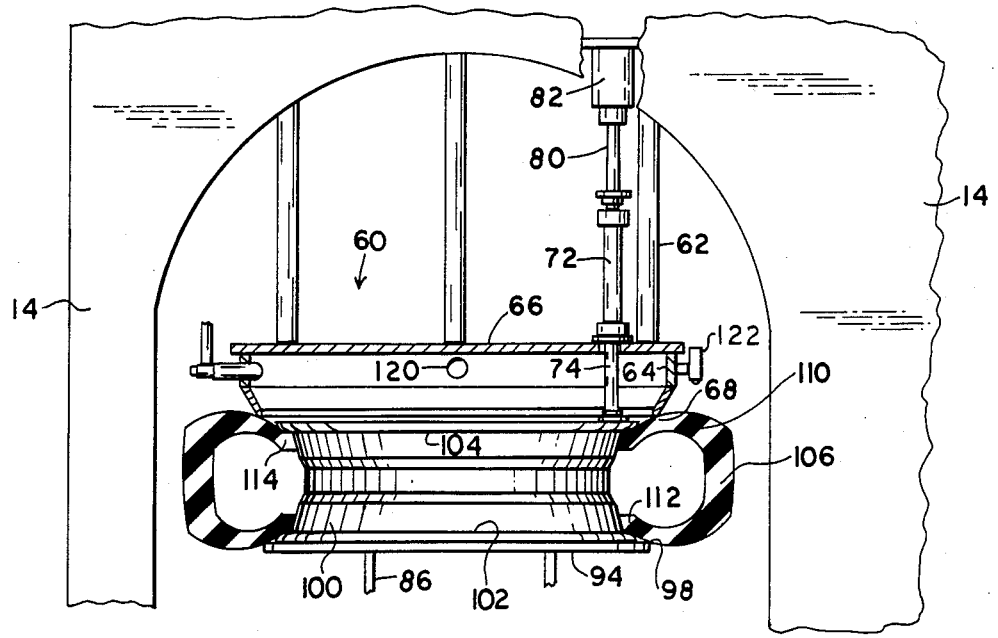
FIG. 3 is an elevational view similar to FIG. 2 illustrating the inflation head raised to the position permitting sealing of the upper tire bead.

Sensing of the desired air pressure within the chamber 118 is accomplished by an electric pressure sensing switch, not shown, and at this time the valve 56 for the hydraulic motor 30 is momentarily opened to permit fluid to flow around piston 34 and permit the seal ring 64 to raise to the position shown in FIG. 3 as sensed by switch 82. The inflation head will raise due to the compressed air within chamber 118, and the position of the inflation head is sensed and controlled by switch 82. Raising of the seal ring 64 permits the bead 114 to seal against wheel rim 104, FIG. 3, and the internal pressure within the tire 106 also produces a sealing relationship between the lower bead 112 and the lower wheel rim 102.

At this time, air is bled from the chamber 118 through fitting 120 and a muffler, not shown, which communicates with chamber 118 to equalize the air pressure within the chamber 118 to the atmosphere. This bleeding of the air within chamber 118 significantly reduces the noise produced during the inflation cycle.

After the air within chamber 118 has been equalized with the atmosphere the valve 56 is opened and valve 52 for the air motor 28 is shifted to pressurize conduit 46 to permit the air motor to quickly raise the carriage and inflation head to the position shown in FIG. 1. The tire 106 is now properly inflated upon the wheel 100, and the conveyor 84 is indexed to transfer the tire to the next station, and align the subsequent pallet, wheel and uninflated tire with the inflation head, and the cycle is repeated.

From the aforegoing description it will be appreciated that the disclosed apparatus is capable of high production in view of the advantages derived by the use of the air and hydraulic motors and the sealing engagement between the pallet plate 94 and the lower tire sidewall 108 eliminates many of the usual leakage problems due to misshapen tires wherein sealing between the lower sidewall bead and wheel rim is relied upon during inflation.

As each cycle of the inflation head 60 is controlled by the width of the wheel through switch 82 various widths of wheels and tires, within limits, may be placed upon the conveyor pallets in a random manner, and yet the apparatus will effectively seal each tire size and inflate the same to the desired pressure. As no sealing engagement to the wheel occurs the usual maintenance for wheel rim seals is eliminated, and as the wheel is not engaged by the inflation apparatus, except for the limit switch sensing rod, the possibility of damage to the wheel has been eliminated.

As described above, the preferred configuration of the pallet plate 94 is circular wherein the periphery 96 and edge 98 will be circular for engagement with the tire sidewall 108. However, sealing between the pallet plate 94 and tire sidewall 108 will also occur if the pallet plate 94 is substantially greater in diameter than that illustrated, for instance, of a diameter or dimension equal to the diameter of the tire 106, and in such instance the tire sidewall 108 will merely rest upon the upper surface of the pallet plate 94. In such event the periphery of the plate 94 need not be circular, and the engagement of the tire sidewall 108 upon the plate 104 occurs at the lowermost portion of the sidewall 108, and a sealing contact occurs at such an annular location. With such a larger pallet plate, the operation is identical to that described above, and sealing still occurs between the pallet plate 94 and the roller tire sidewall during inflation.

Also, in addition to the positioning of the inflation head 60 being controlled by switch 82 it is also contemplated that an optical tire sensing device may be mounted upon the inflation head to provide additional control features. In this respect, a photoelectric tire sensor 122 is mounted upon the outer surface of the seal ring 64 and the sensor 122 includes light emitting means beaming a light ray downwardly upon the tire sidewall 110, and this ray is reflected back upwardly to the sensor 122 where the intensity of reflected light is sensed. In this manner the sensor 122 is able to determine the distance of the seal ring 64 from the tire sidewall 110.

The sensor 122 will detect "abnormal" positioning of the upper tire sidewall 110 prior to inflation. For instance, if the tire 106 has "collapsed" or has a lower vertical dimension than usual due to being crushed during shipping, the sensor 122 will detect this fact as the inflation head 60 is lowered. Thus, although the switch 82 will normally stop the lowering of the seal ring 64 at a predetermined location after the upper rim of the wheel has been engaged by pad 76, the sensor 122 will override the control of solenoid 54 by switch 82 and cause the inflation head to lower a greater extent until a proper location of the seal ring 64 to the tire sidewall 110 is achieved which insures a sealing engagement between the seal ring edge 68 and the tire sidewall 110. Conversely, if the uninflated tire engages the upper wheel rim in its uninflated state, the sensor 122 will sense that only a minimal deflection of the sidewall 110 is required to produce the clearance 116, and the sensor 122 can actuate the solenoid 54 prior to the normal actuation by the switch 82.

It is to be appreciated that the sensor 122 is not capable of as accurately locating the inflation head 60 as is the switch actuator 72 and switch 82, but in those instances wherein the location of the tire sidewall 110 significantly varies from the normal the sensor 122 will function to override the control of switch 82.

It is appreciated that various modifications to the inventive concepts may be apparent to those skilled in the art without departing from the spirit and scope of the invention.

I claim:

1. An apparatus for inflating tubeless tires having side walls and beads upon rimmed wheels having an axis comprising, in combination, a frame having a vertical axis, a vertically movable carriage mounted upon said frame movable between tire sealing, tire seating and tire transfer positions, expansible chamber motor means mounted upon said frame connected to said carriage for selectively moving said carriage between said positions, an annular tire seal mounted upon said carriage, said annular tire seal being mounted upon said carriage concentric to said frame axis and movable with said carriage, said annular tire seal including an annular tire sidewall engagable lip, a flat tire supporting pallet mounted below said tire seal having an upper tire sidewall engagable surface defined thereon, said expansible motor means comprising an expansible air motor and an expansible hydraulic motor, means for expanding and retracting said hydraulic motor concurrently with said air motor, first control means controlling said air motor for moving said carriage between said tire transfer and tire sealing positions and said tire seating and tire transfer positions, second control means controlling said hydraulic motor for locking said hydraulic motor in a fixed position to maintain said carriage at said tire sealing position during tire inflation, said tire seal and pallet surface engaging the sidewalls of a deflated tire supported on said pallet about a rimmed wheel in said tire sealing position wherein said tire seal, pallet and the tire define a chamber, and said tire seal separates the tire upper bead from the wheel upper rim, a source of compressed air communicating with said chamber for inflating the tire, movement of said carriage and tire seal away from said pallet seating to said tire position while said chamber is pressurized permitting the inflated tire beads to seal upon the wheel rims, and further raising of said carriage and tire seal away from said pallet to said tire transfer position allowing removal and insertion of said tire and rimmed wheel.

2. An apparatus for inflating tubeless tires having side walls and beads upon rimmed wheels having an axis comprising, in combination, a frame having a vertical axis, a vertically movable carriage mounted upon said frame movable between tire sealing, tire seating and tire transfer positions, expansible chamber motor means mounted upon said frame connected to said carriage for selectively moving said carriage between said positions, an annular tire seal mounted upon said carriage, said annular tire seal being mounted upon said carriage concentric to said frame axis and movable with said carriage, said annular tire seal including an annular tire sidewall engagable lip, a flat tire supporting pallet mounted below said tire seal having an upper tire sidewall engagable surface defined thereon, said expansible motor means comprising a pair of coaxial cylinders having a common piston rod affixed to said carriage, and a piston within each of said cylinders mounted upon said piston rod, one of said cylinders defining an air motor, and the other of said cylinders defining a hydraulic motor, first control means controlling said air motor for moving said carriage between said tire transfer and tire sealing positions and said tire seating and tire transfer positions, second control means controlling said hydraulic motor for locking said hydraulic motor in a fixed position to maintain said carriage at said tire seal position during tire inflation, said tire seal and pallet surface engaging the sidewalls of a deflated tire supported on said pallet about a rimmed wheel in said tire sealing position wherein said tire seal, pallet and the tire define a chamber, and said tire seal separates the tire upper bead from the wheel upper rim, a source of compressed air communicating with said chamber for inflating the tire, movement of said carriage and tire seal away from said pallet to said tire seating position while said chamber is pressurized permitting the inflated tire beads to seal upon the wheel rims, and further raising of said carriage and tire seal away from said pallet to said tire transfer position allowing removal and insertion of said tire and rimmed wheel.

3. The apparatus for inflating tubeless tires as in claim 1, wherein said pallet includes a horizontal plate defining said surface and including a circular periphery, said upper surface and circular periphery intersecting to define a sharp pallet tire sidewall engagable edge.

4. The apparatus for inflating tubeless tires as in claim 3, wherein said carriage tire seal comprises an inverted cup shaped head having a downwardly extending sidewall terminating in an annular edge engagable with the tire sidewall.

5. The apparatus for inflating tubeless tires as in claim 4, further including carriage position sensing means mounted upon said head and extending into said head in vertical alignment with the rim of a wheel mounted on said pallet, said sensing means being engagable with the wheel rim during displacement of said carriage and including a switch controlling said motor means.

6. The apparatus for inflating tubeless tires as in claim 1, further including tire sidewall sensing means mounted upon said movable carriage for sensing the location of the tire sidewall disposed toward said carriage during movement of said carriage between said tire transfer and tire sealing positions, said tire sidewall sensing means being connected to said first control means.

7. An apparatus for inflating a tubeless tire having sidewalls and beads upon a rimmed wheel having an axis comprising, in combination, a frame having a vertical axis, an upper region and a lower region, vertically extending guides defined upon said frame, a carriage movably mounted upon said guides for vertical movement thereon, an expansible chamber motor mounted upon said frame upper region having a vertically disposed piston rod affixed to said carriage, said motor comprising first and second coaxially aligned cylinders vertically oriented with respect to each other, said piston rod extending into each of said cylinders and having a piston within each cylinder, first control means selectively controlling a supply of compressed air to said first cylinder, second control means selectively controlling the flow of hydraulic oil within said second cylinder, an annular inverted dish-shaped tire seal head mounted upon said carriage for movement therewith having an axis coincident with said frame axis, said head having a downwardly extending sidewall terminating in an annular tire seal sealingly engagable with a tire sidewall, a fitting for compressed air communicating with the interior of said head, a wheel and tire pallet mounted adjacent the lower region of said frame having a vertical axis coincident with said frame axis, said pallet including a horizontal air impervious plate having a flat upper surface and a circular periphery, said upper surface and periphery intersecting to define a circular edge engagable with the lower sidewall of a tire lying on said pallet upper surface substantially concentric to said frame axis and disposed about a rimmed wheel, said motor means selectively moving said carriage and head from a raised tire transfer position to a lower tire seal position wherein said tire seal seal and pallet edge engage the tire sidewalls and the upper tire bead is separated from the wheel upper rim to an intermediate tire seat position wherein the tire beads seal against the wheel rims.

8. The apparatus for inflating a tubeless tire as in claim 7 wherein said first control means controls operation of said first cylinder and associated piston by compressed air to shift said carriage and head downwardly from said tire transfer position to the tire seal position and upwardly from the tire seat position to the tire transfer position in a rapid traverse manner.

9. The apparatus for inflating a tubeless tire as in claim 7 wherein said second control means controls operation of said second cylinder and associated piston by hydraulic fluid to hold said head in engagement with the tire sidewall during inflation.

10. The apparatus for inflating a tubeless tire as in claim 7, further including a conveyor located at said frame lower region, and a plurality of pallets mounted upon said conveyor for selective alignment with said frame axis.

11. The apparatus for inflating a tubless tire as in claim 7, further including carriage position sensing means mounted upon said head and extending into said head in vertical alignment with the rim of a wheel mounted on said pallet, said sensing means being engagable with the wheel rim during displacement of said carriage and including a switch controlling said motor means.

12. The apparatus for inflating a tubeless tire as in claim 7 further including tire sidewall sensing means mounted upon said carriage for sensing the location of the tire sidewall disposed toward said carriage, said sidewall sensing means including light emitting means and reflected light receiving means wherein the location of the sensed tire sidewall is optically determined, said tire sidewall sensing means being operatively connected to said first control means.

* * * * *

UNITED STATES PATENT AND TRADEMARK OFFICE
CERTIFICATE OF CORRECTION

PATENT NO. : 4,735,250

DATED : April 5, 1988

INVENTOR(S) : John P. Kane

It is certified that error appears in the above-identified patent and that said Letters Patent is hereby corrected as shown below:

Column 10, line 13, delete the second occurrence of "seal" and insert --head--.

Signed and Sealed this

Eighth Day of November, 1988

Attest:

DONALD J. QUIGG

*Attesting Officer*

*Commissioner of Patents and Trademarks*